(12) United States Patent
Kloss et al.

(10) Patent No.: US 11,167,591 B2
(45) Date of Patent: Nov. 9, 2021

(54) PERSON SUPPORT APPARATUS WITH BRAKING SYSTEM

(71) Applicant: Stryker Corporation, Kalamazoo, MI (US)

(72) Inventors: Jacob Paul Kloss, Harbor Springs, MI (US); Charles Louis Crouch, Plainwell, MI (US); Anish Paul, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 151 days.

(21) Appl. No.: 16/371,212

(22) Filed: Apr. 1, 2019

(65) Prior Publication Data

US 2019/0225015 A1    Jul. 25, 2019

Related U.S. Application Data

(63) Continuation of application No. 15/284,673, filed on Oct. 4, 2016, now Pat. No. 10,245,886.

(60) Provisional application No. 62/238,173, filed on Oct. 7, 2015.

(51) Int. Cl.
  *B60B 33/02*   (2006.01)
  *B60B 33/00*   (2006.01)
  *A61G 5/10*    (2006.01)

(52) U.S. Cl.
  CPC .......... *B60B 33/0092* (2013.01); *A61G 5/101* (2013.01); *B60B 33/021* (2013.01); *B60B 33/026* (2013.01)

(58) Field of Classification Search
  CPC .............. A61G 5/1005; B60B 33/0078; B60B 33/0092; B60B 33/021; B60G 17/02
  See application file for complete search history.

(56) References Cited

U.S. PATENT DOCUMENTS

| 3,304,116 | A | * | 2/1967 | Stryker ............... A61G 7/0507 296/20 |
| 3,904,215 | A | * | 9/1975 | Bardy .................... A63C 17/20 280/11.212 |
| 4,080,809 | A | * | 3/1978 | Ross ..................... B60B 33/021 16/35 R |
| 4,657,230 | A |   | 4/1987 | Weseloh |
| 4,716,781 | A |   | 1/1988 | Dussault |
| 5,205,381 | A |   | 4/1993 | Mehmen |
| 5,377,372 | A |   | 1/1995 | Rudolf et al. |

(Continued)

FOREIGN PATENT DOCUMENTS

WO    2015032003 A1    3/2015

*Primary Examiner* — James A English
(74) *Attorney, Agent, or Firm* — Warner Norcross + Judd LLP

(57) ABSTRACT

A person support apparatus includes a base frame with a plurality of caster wheel assemblies, each of the caster wheel assemblies including a caster brake actuator movable between a total braking position and a non-braking position. A linkage system is coupled to the caster brake actuators for controlling the caster brake actuators and is operable to move the caster brake actuators between their total braking positions and their non-braking positions. The linkage system is configured to compensate for tolerances in the linkage system wherein the linkage system can control the caster brake actuators to simultaneously move between their total braking positions and their non-braking positions.

19 Claims, 16 Drawing Sheets

(56) References Cited

U.S. PATENT DOCUMENTS

| | | |
|---|---|---|
| 6,230,343 B1 | 5/2001 | Buiskool et al. |
| 6,240,579 B1 | 6/2001 | Hanson et al. |
| 6,264,006 B1 | 7/2001 | Hanson et al. |
| 6,321,878 B1 | 11/2001 | Mobley et al. |
| 6,725,956 B1 | 4/2004 | Lemire |
| 6,792,630 B1 | 9/2004 | Palmatier et al. |
| 6,951,034 B2 | 10/2005 | Shiery et al. |
| 7,062,805 B2 | 6/2006 | Hopper et al. |
| 8,191,909 B2 | 6/2012 | Livengood et al. |
| 8,196,237 B2 | 6/2012 | Herbst et al. |
| 8,205,297 B2 * | 6/2012 | Fallshaw .............. B60B 33/0068 16/35 R |
| 8,528,704 B2 | 9/2013 | Hayes et al. |
| 8,910,953 B2 | 12/2014 | Faulhaber |
| 9,351,890 B2 | 5/2016 | Hough et al. |
| 9,555,778 B2 | 1/2017 | Lemire et al. |
| 2008/0120810 A1 * | 5/2008 | Reckelhoff .............. A61G 7/05 16/35 R |
| 2011/0120815 A1 * | 5/2011 | Frolik ................ B60B 33/0068 188/1.12 |
| 2012/0038128 A1 | 2/2012 | Nimura |
| 2014/0265497 A1 | 9/2014 | Hough et al. |
| 2016/0022513 A1 * | 1/2016 | Spoor ..................... A61G 1/04 296/20 |
| 2016/0296388 A1 | 10/2016 | Hertz |
| 2017/0002752 A1 | 1/2017 | Chi et al. |
| 2017/0008340 A1 * | 1/2017 | Iiyama ................ B60B 33/021 |

\* cited by examiner

PERSON SUPPORT APPARATUS WITH BRAKING SYSTEM

This application is a continuation of U.S. application Ser. No. 15/284,673, filed Oct. 4, 2016, entitled PERSON SUPPORT APPARATUS WITH BRAKING SYSTEM, which claims the benefit of U.S. provisional application Ser. No. 62/238,173, filed on Oct. 7, 2015, entitled PERSON SUPPORT APPARATUS WITH BRAKING SYSTEM, by Applicant Stryker Corporation, which are incorporated by reference herein in their entireties.

TECHNICAL FIELD

The present disclosure relates to a person support apparatus, and more specifically to a wheeled person support apparatus with a braking system.

BACKGROUND

Braking systems for support apparatuses with multiple lockable caster wheel assemblies have employed a variety of links, such as cables, linkages, to brake each of the wheels based on input from a single pedal. However, tolerances exist within the links so that it is often difficult to brake all four wheels at the same time.

SUMMARY

In one embodiment, a patient support apparatus includes a base, a plurality of wheels attached to the base, the wheels being freely movable between a non-braking state and a total braking state, a user controlled actuator, such as a foot pedal, operable to switch between an activation state and a non-activation state, and a linkage system coupling the wheels to the user controlled actuator. The linkage system is operable to move the wheels in the total braking state when the user controlled actuator is in the activation state and to move the wheels in the non-braking state when the user controlled actuator is in the non-activation state.

In one aspect, the linkage system comprises a drive mechanism. The drive mechanism is operable to toggle between a first position and a second position. When the user controlled actuator is in activation state, the drive mechanism is configured to toggle to the first position and to move the wheels to the total braking state. When the user controlled actuator is in the non-activation state, the drive mechanism is configured to toggle to the second position and move the wheels to the non-braking state.

In another embodiment, the linkage system further comprises an over-travel mechanism. The over-travel mechanism is configured to absorb extra force and/or play in the linkage system when the first position is beyond what is necessary to move the wheels in the total braking state.

In yet another embodiment, the linkage system further comprises an over-travel mechanism, which is configured to absorb extra force and/or play in the linkage system when the second position is beyond what is necessary to move the wheels in the non-braking state.

In yet another one embodiment, a person support apparatus includes a base with a plurality of caster wheel assemblies, with each of the caster wheel assemblies including a caster brake actuator associated therewith that is movable between a braking position and a non-braking position. The apparatus also includes a linkage system coupled to the caster brake actuators for controlling the caster brake actuators and that is operable to move the caster brake actuators between their braking positions and their non-braking positions. The linkage system is configured to compensate for tolerances in the linkage system wherein the linkage system can substantially simultaneously move the caster brake actuators between their braking positions and their non-braking positions.

In one aspect, the linkage system includes a user controlled actuator, such as a foot pedal.

In another aspect, the foot pedal includes a two position foot pedal having a first position corresponding to a braking position and a second position corresponding to a non-braking position.

In a further aspect, the linkage system includes an over-travel mechanism coupled to each of the caster brake actuators. When the user controlled actuator is moved to its braking position, the linkage system is configured to move to beyond what is necessary to move to the caster brake actuators to their braking positions, with the over-travel mechanism absorbing any extra force generated by or play in the linkage system.

For example, in one embodiment, the linkage system includes pull cables.

According to one aspect, the caster wheel assemblies include a pair of front caster wheel assemblies and a pair of rear caster wheel assemblies, with the pull cables coupled to the front caster wheel assemblies.

In any of the above, the linkage system further includes a drive rod with pull cables coupled to and driven by the drive rod.

In another aspect, the linkage system includes a drive rod with drive links coupled to the drive rod.

According to a further aspect, the user controlled actuator is mounted to the drive rod, which has a longitudinal axis of rotation. The user controlled actuator is operable to rotate the drive rod about the longitudinal axis of rotation to thereby move the drive links to move the caster brake actuators between their braking and non-braking positions.

For example, the person support apparatus may include a spring, with the spring applying a biasing force to the drive rod. In a further aspect, the spring comprises an over-center spring that applies the biasing force to urge the drive rod toward a braking orientation or toward a non-braking orientation or both.

In another aspect, the person support apparatus includes a support frame for supporting a person thereon, with the base supporting the support frame. In one embodiment, the person support apparatus may include a medical recliner chair.

In another embodiment, a person support apparatus includes a base with a plurality of caster wheel assemblies. Each of the caster wheel assemblies includes a caster brake actuator, which is movable between a total braking position and a non-braking position, and a linkage system coupled to the caster brake actuators for controlling the caster brake actuators and operable to move the caster brake actuators between their total braking positions and non-braking positions. The linkage system includes a user controlled actuator, and the linkage system biases the user controlled actuator toward a braking position or a non-braking position.

In one aspect, the user controlled actuator comprises a foot pedal. In another aspect, the linkage system includes an over-center spring for biasing the foot pedal toward the braking position or the non-braking position.

In yet another aspect, the foot pedal is mounted for vertical movement between an up position and a down position.

According to yet another aspect, the linkage system is configured to cause the caster brake actuators to simultaneously move between their braking positions and the non-braking positions.

In one embodiment, the person support apparatus comprises a medical recliner chair.

In yet another embodiment, a person support apparatus includes a base with a caster wheel assembly, which includes a wheel support and a wheel that is mounted to the base by the wheel support for swivel movement about a generally vertical axis and for rotation about a generally horizontal axis. The caster wheel assembly also includes a caster brake actuator for movement between a non-braking position and a braking position to stop movement of the wheel support about the swivel axis and the movement of the wheel about the rotational axis. The person support apparatus further includes a linkage system coupled to the caster brake actuator for controlling the caster brake actuator. The caster brake actuator is configured for free movement between the braking position and the non-braking position.

In one aspect, the caster brake actuator is biased in its non-braking position.

In a further aspect, the linkage includes an over-center mechanism that toggles the caster brake actuator between its braking position and its non-braking position.

In a further aspect, the linkage includes a user controlled actuator, such as a foot pedal. The foot pedal comprises a two-position foot pedal, with a braking position and a non-braking position.

In a further aspect, the base includes a plurality of the caster wheel assemblies with the linkage system configured to simultaneously brake each of the caster wheel assemblies.

In another aspect, the linkage system includes an over-travel mechanism and drive links coupled to the caster brake actuators. When the linkage system moves the caster brake actuators to their braking positions, the drive links are moved beyond what is necessary to move the caster brake actuators to their braking positions. The over-travel mechanism absorbs any extra force generated by and/or play in linkage system.

According to yet another embodiment, a person support apparatus includes a base with a caster wheel assembly. The caster wheel assembly includes a wheel support and a wheel mounted to the wheel support for swivel movement about a generally vertical axis and for rotational movement about a generally horizontal axis. The caster wheel assembly further includes a caster brake actuator configured for free movement between a braking position and a non-braking position wherein the caster wheel assembly requires an external mechanism to move the caster brake actuator to its braking or non-braking position.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
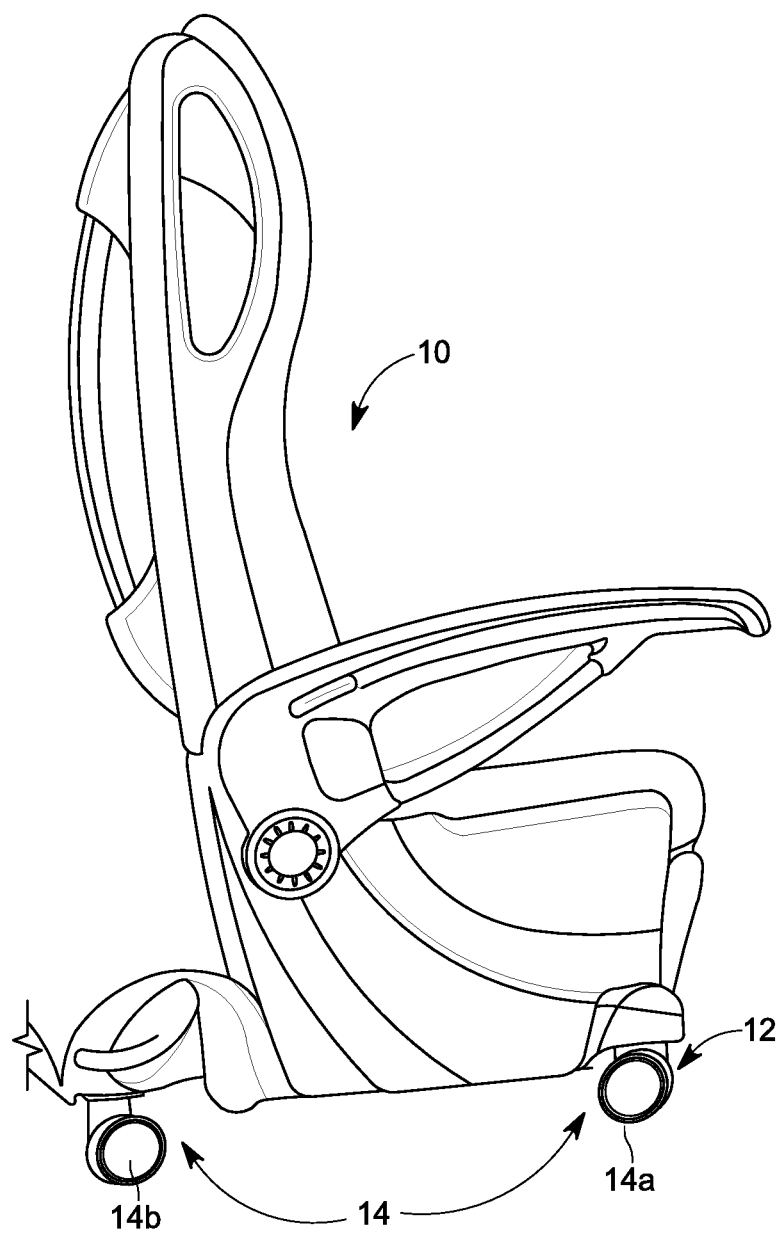
FIG. 1 is a side view of a person support apparatus.

Referring to FIG. 1, the numeral 10 generally designates a person support apparatus, which is suitable for use in transporting or supporting a person, including a patient. Although illustrated as a recliner chair, apparatus 10 may be configured as another type of support apparatus, including a wheelchair, a bed, a cot, or stretcher, or the like. Apparatus 10 includes a wheeled base 12 to allow apparatus 10 to be wheeled across a floor surface. And, as will be more fully described below, apparatus 10 is configured to selectively, simultaneously brake the wheels, and hence stop movement of the apparatus 10.

Figure 2:
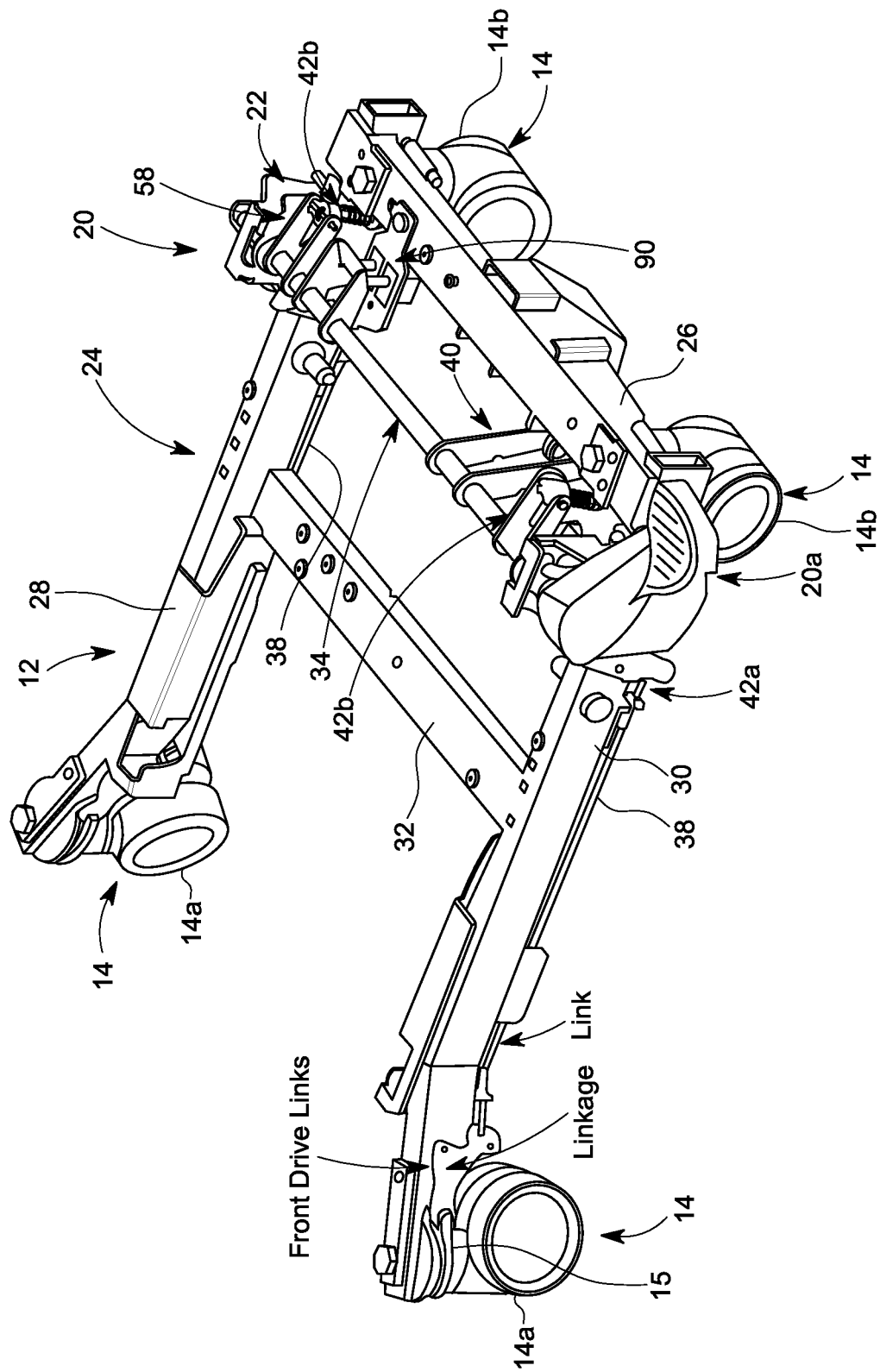
FIG. 2 is a perspective view of a base of the person support apparatus of FIG. 1.

Referring to FIG. 2, wheeled base 12 includes a plurality of caster wheel assemblies 14. In the illustrated embodiment, each caster wheel assembly 14 includes a caster wheel and an internal brake associated therewith, which brakes the rotational and swivel of the wheel about its horizontal rotational axis and its vertical swivel axis. Each wheel assembly 14 further includes a caster brake actuator in the form of a caster brake pedal 15 (FIG. 2), which is coupled to the internal brake of the caster wheel assembly but which is external to wheel assembly 14. The caster brake pedal 15 is movable between a "total brake" position or a non-braking position. A "total brake" is when the wheel is in a total brake state—in other words, locked about its horizontal rotational axis as well as its vertical swivel axis. Optionally, each caster wheel assembly includes a spring, such as an internal spring, to bias the caster brake pedal 15 towards its non-braking position. A suitable caster wheel assembly with an associated internal brake, an internal spring, and a caster brake pedal is available from Fallshaw, Inc., which is described in U.S. Pat. No. 8,205,297, which is incorporated by reference herein in its entirety.

Alternately, the wheels may include a frictional braking system, such as disclosed in co-pending application U.S. Pat. App. Ser. No. 62/196,396 entitled SYSTEM AND METHOD OF BRAKING FOR A PATIENT SUPPORT APPARATUS (P-471), filed on Jul. 24, 2015, which is commonly owned by Stryker Corporation of Kalamazoo, Mich., which is incorporated by reference herein in its entirety. As will be more fully described below, each caster brake pedal 15 may be mounted to freely move between its total brake position and it non-braking position, so that the caster wheel assemblies 14 are locked in their braking or non-braking positions by an external mechanism.

To control the caster brake actuators of each caster wheel assembly 14, base 12 supports a linkage system 20 that couples to each of the caster brake actuators 15 and, further, is configured to brake each of the wheels simultaneously about their rotational and swivel axes. As will be described below, linkage system 20 may be configured to compensate for play between the linkage system components, for example due to manufacturing tolerances, creep, cable stretch etc., wherein the linkage system can control the caster brake actuators and, hence, internal brakes to simultaneously move between their braking and non-braking positions.

In one embodiment, linkage system 20 is configured to move beyond what is necessary to move the caster brake actuators to their braking position, but to absorb any extra force generated by and/or play in the linkage system so that the brakes are all moved to their braking positions substantially simultaneously so that the linkage system acts as a central timing system.

Figure 3:
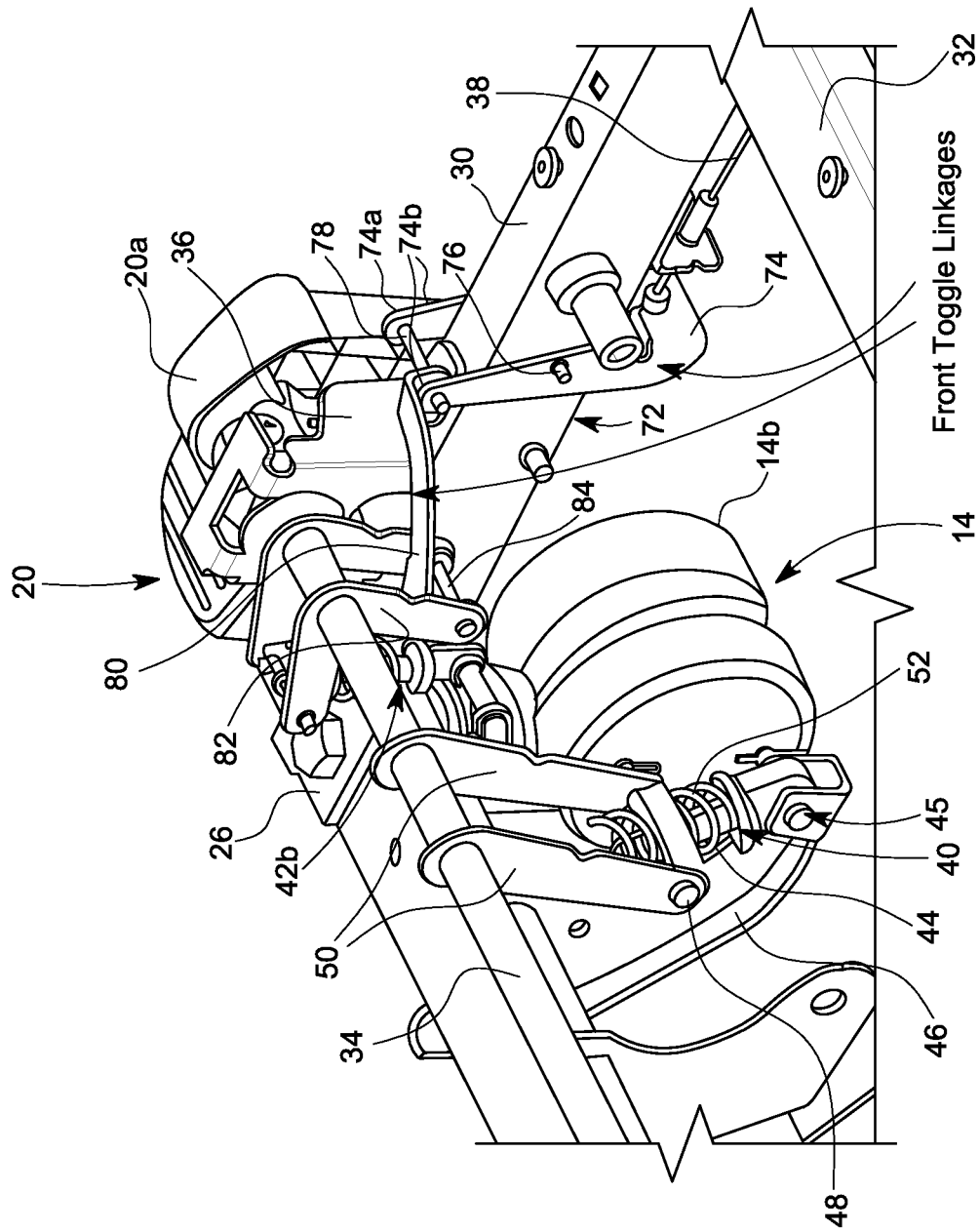
FIG. 3 is an enlarged fragmentary view of the base of FIG. 2.

As best seen in FIGS. 2 and 3, base 12 includes a U-shaped frame 24 to which caster wheel assemblies 14 are mounted. Frame 24 includes a transverse frame member 26 and a pair of longitudinal frame members 28 and 30, which are maintained in a spaced, parallel relationship by transverse frame member 26 and an intermediate transverse member 32 that is fixed at both of its ends to medial portions of longitudinal frame members 28 and 30, and which is generally parallel to transverse frame member 26.

Transverse frame member 26 is located at the rear of apparatus 10, typically where a caregiver would stand when pushing apparatus 10 across a floor surface, and further provides a mount for the rearward caster wheel assemblies 14b. Longitudinal frame members 28 and 30 extend forward from transverse frame member 26 toward the front of apparatus 10, with the forward ends of longitudinal frame members 28 and 30 providing mounts for the forward caster wheel assemblies 14a.

Frame 24 supports linkage system 20 and one or more user controlled actuators that are coupled to the linkage system and that allow a caregiver to press on one of the foot pedals to actuate all four internal brakes for a "total brake" or for a release of all internal brakes. The user controlled actuators are switchable between an activation state and a non-activation state. Optionally, the user controlled actuators may be in the form of an input, such as a button, including a touch screen button, to a controller, such as described in U.S. Pat. No. 7,690,059, which is commonly owned by Stryker Corporation of Kalamazoo, Mich. and is incorporated by reference herein in its entirety. In the illustrated embodiment, user controlled actuators comprise foot pedals 20a whose activation state corresponds to a "total brake" position and whose non-activation state corresponds to a non-braking position. As described above, a "total brake" is when the wheel of the caster wheel assembly 14 is in a total brake state—in other words, the wheel is locked about its horizontal rotational axis as well as its vertical swivel axis.

In the illustrated embodiment, linkage system 20 includes a drive rod 34, which is journaled in and supported for rotational movement about its longitudinal axis 34a by a pair of brackets 36 mounted to frame members 28 and 30. Drive rod 34 is configured so that when it is rotated about its longitudinal axis 34a by either foot pedal 20a, drive rod 34 moves the caster brake actuators and, hence, internal brakes on the forward and rearward caster wheel assemblies 14a, 14b either to their "total brake" positions or their non-braking positions. As described more fully below, linkage system 20 also includes a drive mechanism that rotates drive rod 34 to a braking orientation that is beyond what is necessary to move the caster brake actuators 15 to their braking position that is beyond what is necessary to move the caster brake actuators 15 to their braking position, and optionally also to a non-braking position that is beyond what is necessary to move the caster brake actuators 15 to their non-braking position.

In the illustrated embodiment, foot pedals 20a are each mounted to an end 34b of rod 34. In one aspect, each foot pedal 20a has only two defined positions—a braking position and a non-braking position. Further, each foot pedal 20a is biased toward its braking position or its non-braking position, or both positions. Optionally, each foot pedal 20a may be biased when in the braking position or the non-braking position, or in both positions. In yet another aspect, each foot pedal 20a is mounted for vertical movement between an up position and a down position.

Figure 3A:
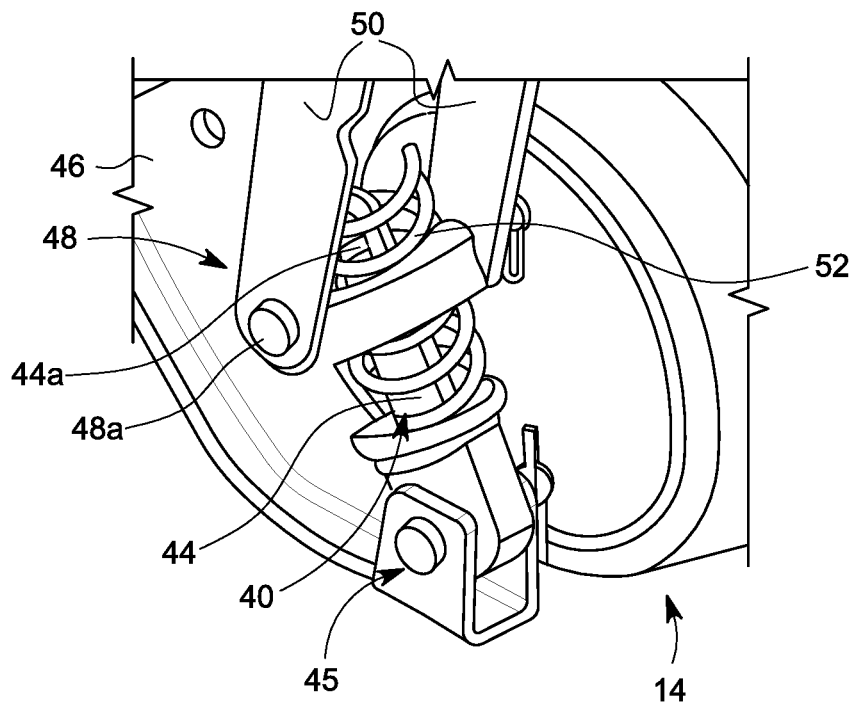
FIG. 3A is an enlarged perspective view of a drive mechanism.
Figure 3B:
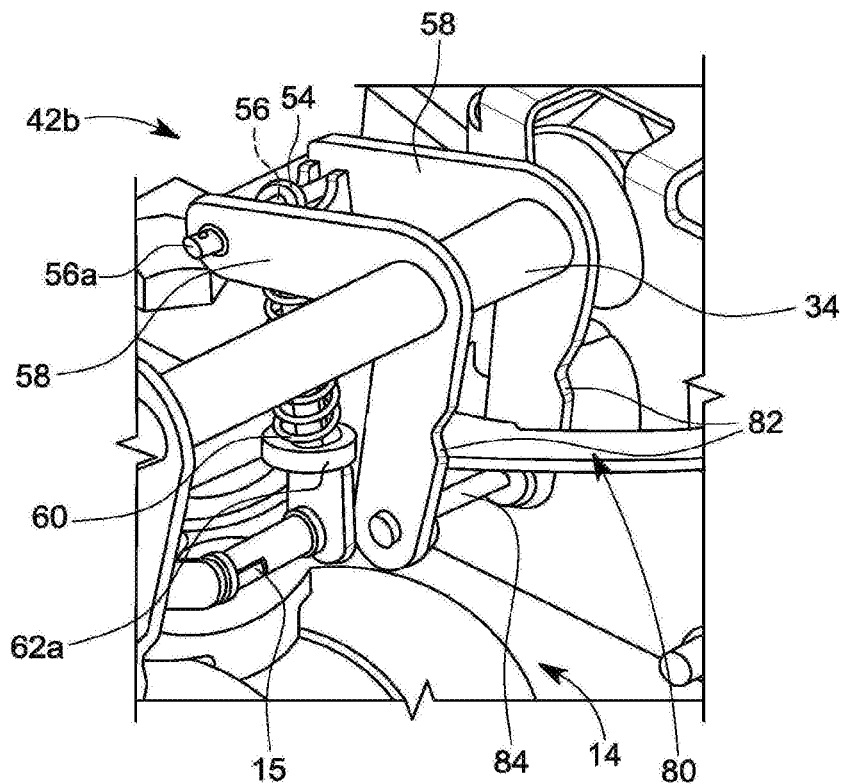
FIG. 3B is an enlarged perspective view of an over-travel mechanism.
Figure 3C:
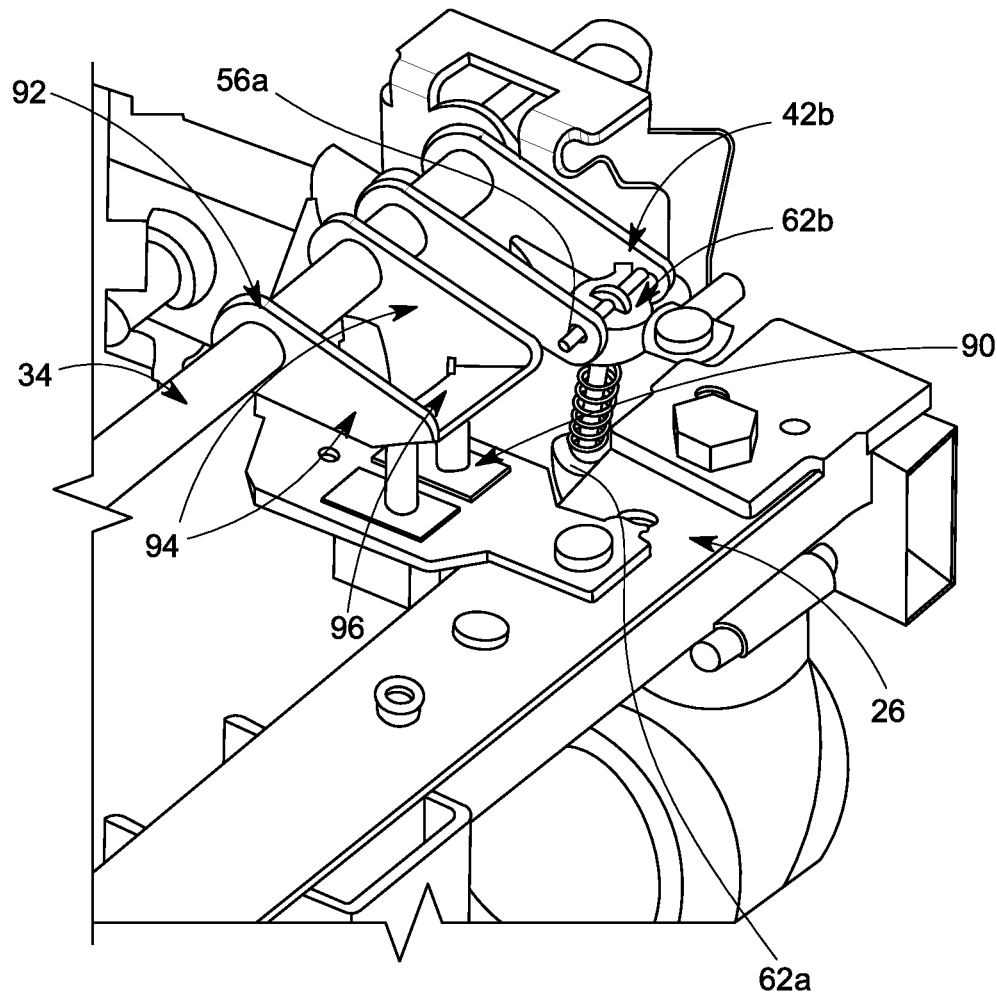
FIG. 3C is an enlarged perspective view of a brake status switch.
Figure 3D:
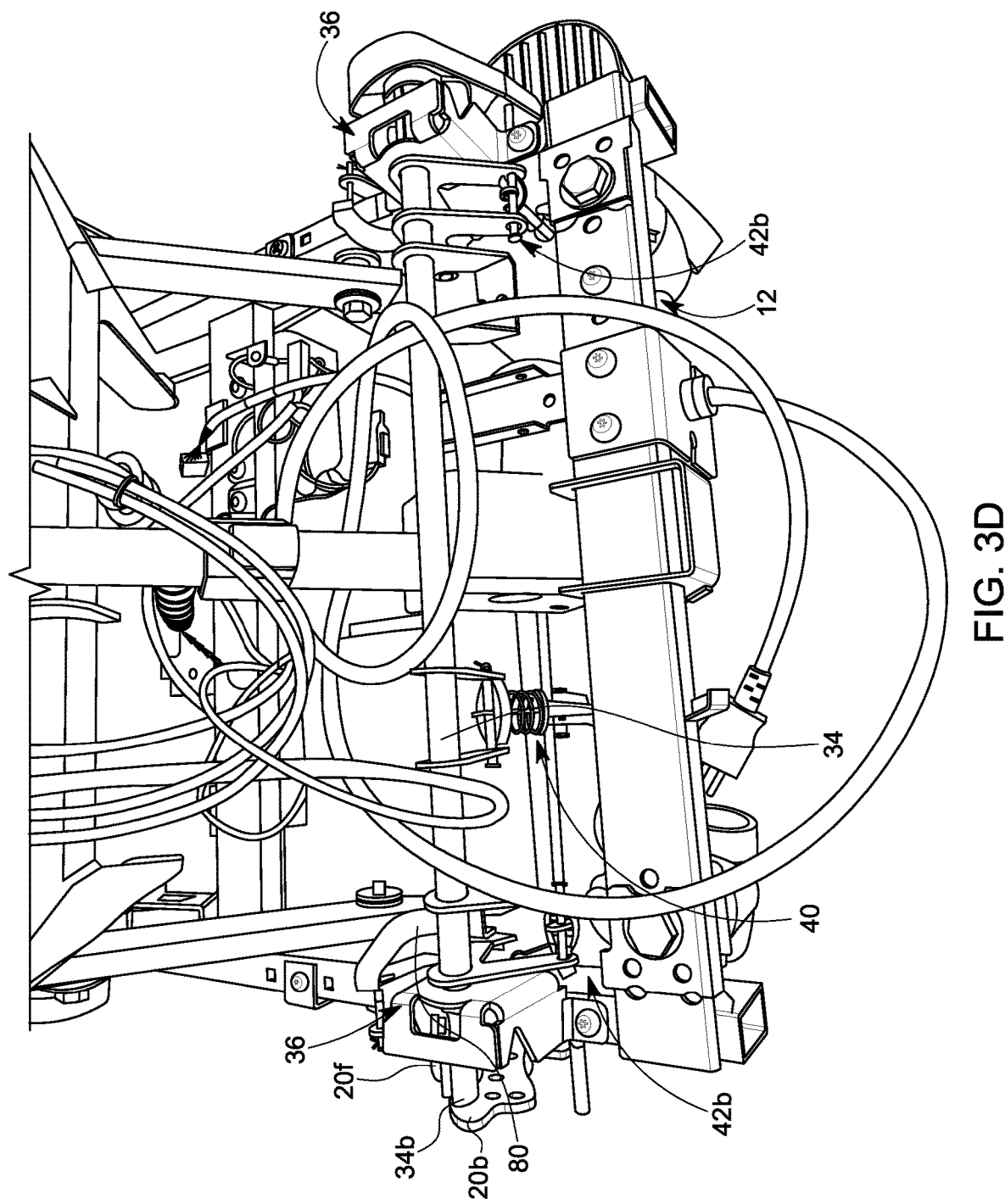
FIG. 3D is a perspective view of the base illustrating the drive mechanism and the over-travel mechanisms of the rearward caster wheels.
Figure 3E:
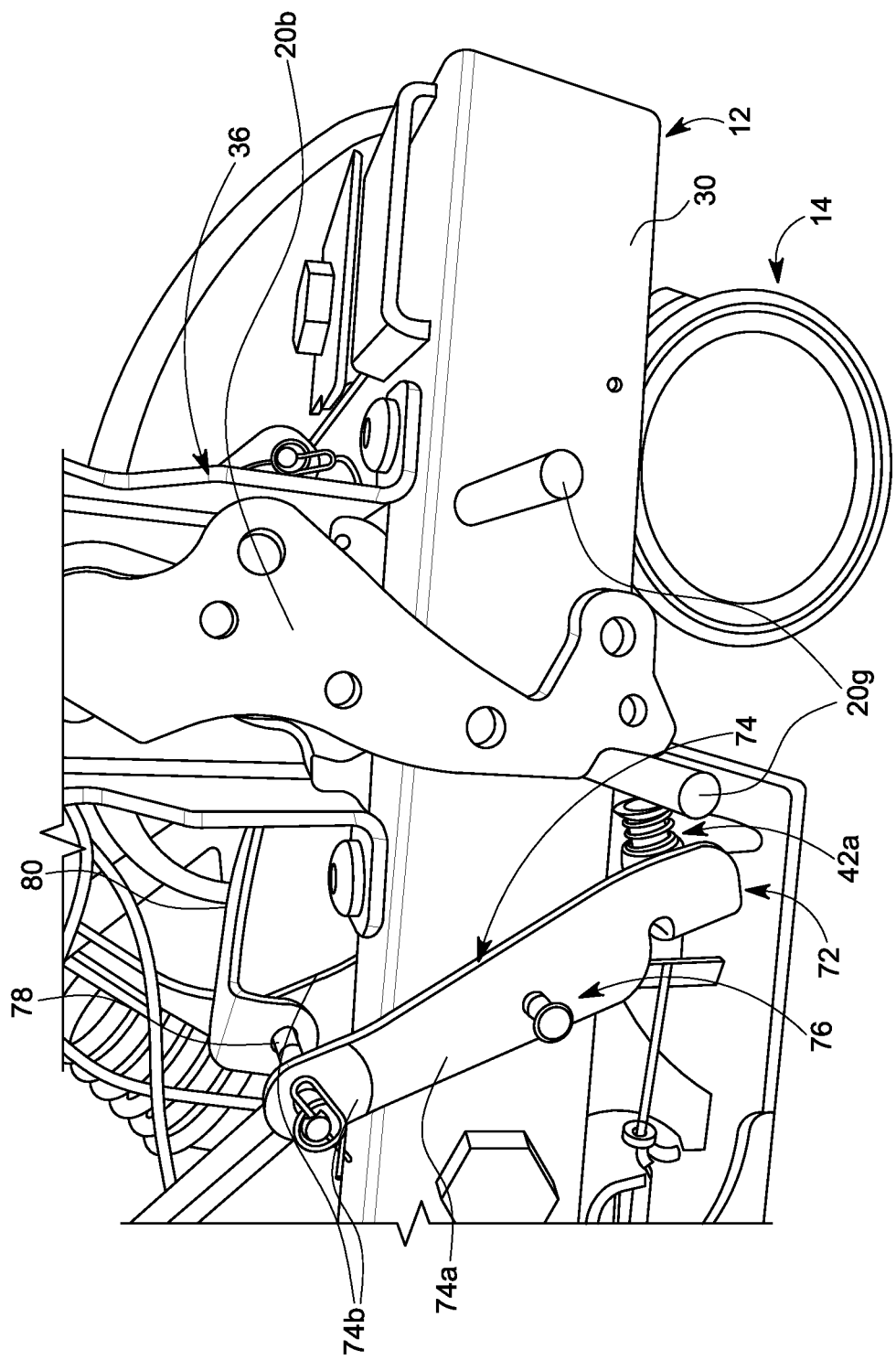
FIG. 3E is an enlarged side view of a portion of the base and of the linkage system illustrating the foot pedal bracket and foot pedal stops.
Figure 3F:
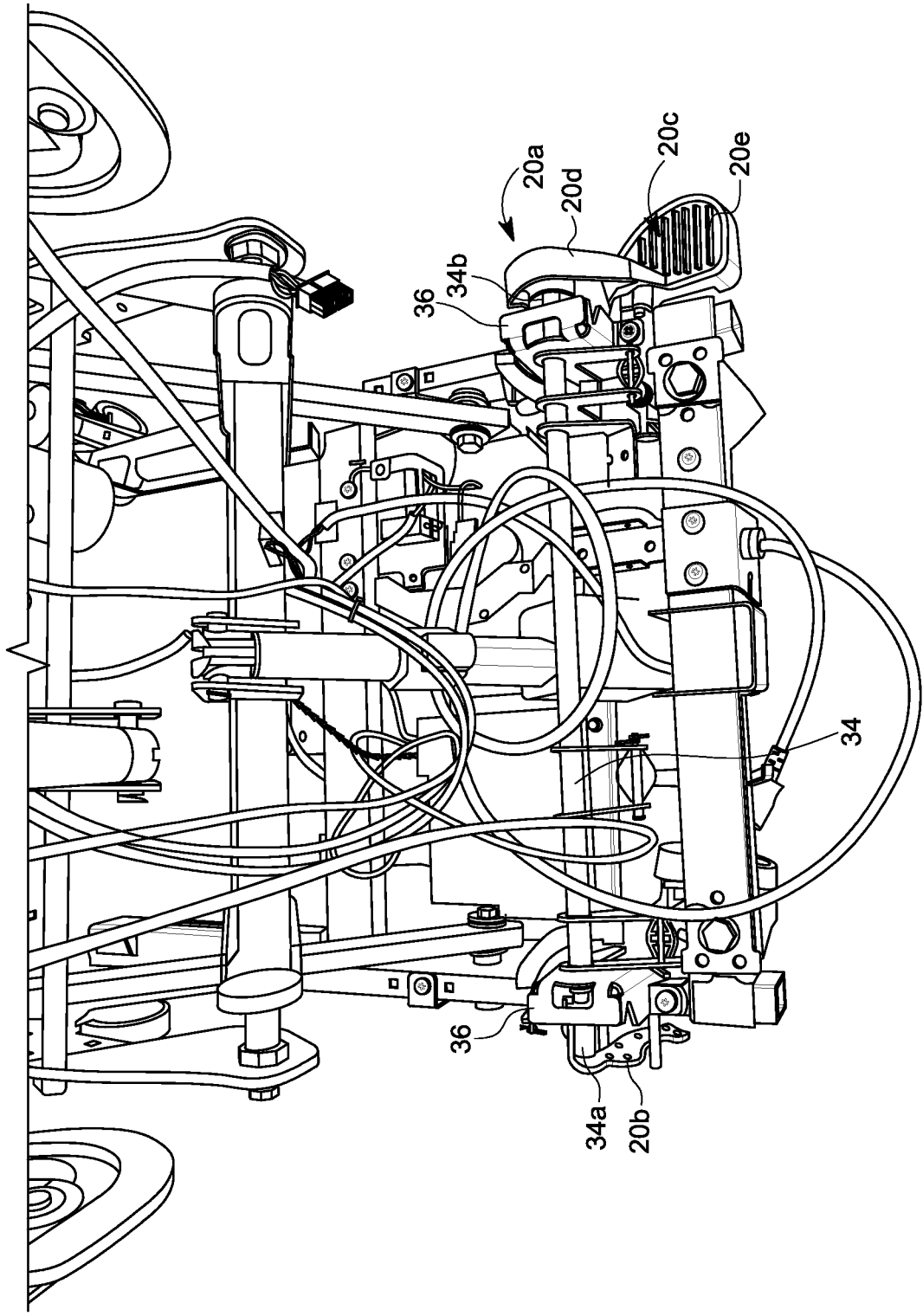
FIG. 3F is another perspective view of the base illustrating the foot pedal bracket and foot pedal body.

Referring to FIGS. 3D, 3E, and 3F, each foot pedal 20a includes a bracket 20b and a foot pedal body 20c, such as a plastic molded body. Foot pedal body 20c includes a mounting portion 20d that mounts foot pedal body 20c to bracket 20b and an actuation portion 20e that provides a step for an operator's foot.

As best understood from FIG. 3D, bracket 20b is mounted to end 34b of rod 34 by fasteners 20f so that when foot pedal 20a is pressed downwardly on actuation portion 20e (FIG. 3F), rod 34 will rotate in a clockwise direction (as viewed in FIG. 3E), which will move the caster brake pedals 15 to their total braking positions and thereby brake the caster wheels.

As noted above, each foot pedal 20a has only two defined positions—namely, the braking position and the non-braking position. The defined positions of each of the foot pedals are limited by two pins 20g (FIG. 3E), which are mounted to frame members 28, 30 of base 12, just beyond the foot pedal's braking position and just beyond the foot pedal's non-braking position. And, as more fully described below, foot pedals 20a are biased between their two defined positions by the drive mechanism, which is in the form of an over-center mechanism, which forms a toggle for the foot pedals to toggle the foot pedals between their braking position and their non-braking position. Over-center mechanism 40, therefore, forms a toggle for the foot pedals.

As noted above, linkage system 20 may be configured to compensate for tolerances that exist in the linkage system components, for example due to manufacturing tolerances, creep, cable stretch etc., wherein the linkage system can control the internal brakes to simultaneously move between their braking and non-braking positions. In the illustrated embodiment, linkage system 20 includes over-travel mechanisms 42a and 42b associated with the forward caster wheel assemblies 14a and the rearward caster wheel assemblies 14b, respectively. As will be more fully described below, over-travel assemblies 42a, 42b allow the drive mechanism to drive the drive rod 34 beyond what is necessary for the caster brake pedals 15 to move to their total brake positions to assure that all four internal brakes of the caster wheel assemblies 14 are in their braking positions simultaneously. Alternately, over-travel assemblies 42a, 42b may be configured to allow the drive mechanism to drive the drive rod 34 beyond what is necessary to move the caster brake pedals 15 beyond their non-braking positions to assure that all four internal brakes of the caster wheel assemblies 14 are in their non-braking positions simultaneously. Further yet, over-travel assemblies 42a, 42b may be configured to allow the drive mechanism to drive the drive rod beyond what is necessary to move the caster brake pedals 15 beyond both their non-braking positions and their total brake positions to assure that all four internal brakes of the caster wheel assemblies 14 are in their non-braking positions or in their total brake positions simultaneously.

To actuate the internal brakes on forward caster wheel assemblies 14a, linkage system 20 includes a pair of pull cables 38, which are coupled to the drive rod 34 and coupled to the caster brake pedals 15 of the forward caster wheel assemblies 14a. For example, a suitable pull cable may comprise a Bowden cable. In this manner, when drive rod 34 is rotated about its longitudinal rotational axis, cables 38 move the caster brake pedals 15 of forward caster wheel assemblies 14a to their braking positions so that the internal brakes on each of the forward caster wheel assemblies are moved to their braking positions. Furthermore, cables 38 include over-travel assemblies 42a (FIG. 2) that, as noted, are configured to absorb any extra force or play imparted by the linkage system when moving the caster brake actuators 15 of the forward caster wheel assemblies 14a when moved to their braking positions. As will be more fully described below, caster brake pedals 15 are returned to their non-braking positions by springs, optionally internal springs, at the caster wheel assemblies.

In one embodiment, the drive mechanism comprises an over-center mechanism 40. As noted, over-center mechanism 40 is configured to bias the position of drive rod 34 toward one of two angular positions or orientations, namely a braking orientation or a non-braking orientation, which as noted may correspond to orientations that are beyond what is necessary to move the caster brake pedals 15 beyond their non-braking positions and/or their total brake positions to assure that all four internal brakes of the caster wheel assemblies 14 are in their non-braking positions or in their total brake positions simultaneously.

As best seen in FIG. 3, over-center mechanism 40 includes a link 44. Link 44 is pivotally mounted on one end by a pin connection 45 to a bracket 46, which is rigidly mounted to transverse member 26. Link 44 is also coupled to drive rod 34 by a sliding pin connection 48. Sliding pin connection 48 includes a pin 48a that is received in and extends through slotted opening 44a of link 44 so that as drive rod 34 is rotated about its longitudinal axis, pin 48a will move along slotted opening 44a in link 44. The opposed free ends of pin 48a (FIG. 3A) are eccentrically coupled to drive rod 34 by a pair of arms or links 50, which are fixed to drive rod 34 so that they rotate with drive rod 34. Link 44, therefore, guides the rotation of rod 34 between the two defined orientations—namely, the braking orientation, which corresponds to the foot pedals being in their braking position, and the non-braking orientation, which corresponds to the foot pedals being in their non-braking position. Further, as more fully described below, over-center mechanism 40 biases the drive rod 34 toward one of the two orientations.

To bias drive rod 34 toward one of its two orientations, over-center mechanism 40 also includes a spring 52. Spring 52 provides the over-center spring function to bias drive rod 34 toward either its braking orientation or its non-braking orientation. Spring 52 is mounted about link 44 to apply a spring force to the sliding pin 48a of sliding pin connection 48. When one of the foot pedals is pressed down or lifted up, drive rod 34 will rotate about its longitudinal axis, which causes pin 48a to move down slotted opening 44a against the force of spring 52. As the drive rod 34 continues to rotate, pin 48a, which moves in an arcuate path, will return to its original position along the slotted opening so that the spring 52 will return to its less compressed or uncompressed state. Thus, pin 48a is in a neutral position (unbiased by the spring or biased with a lower spring force) when it is in the top of the slotted opening, which corresponds to the braking orientation or the non-braking orientation of drive rod 34. Thus, the most compressed state of spring 52 is between the braking orientation and the non-braking orientation of the drive rod. It should be understood that the link 44 may be mounted so that the neutral position is at the bottom of the slot.

In this manner, when drive rod 34 is rotated about its longitudinal axis between its braking orientation and non-braking orientation, pin 48a moves along elongated slot 44a of link 44 against the force of the spring until pin 48a is again in its neutral position where the spring no longer applies a biasing force or applies a reduced biasing force against pin 48a. Thus, when a downward pressure is applied to one of the foot pedals 20a, over-center mechanism 40 will urge the drive rod 34 to its braking orientation. And, when an upward pressure applied to one of the foot pedals 20a over-center mechanism 40 will urge the drive rod 34 to its non-braking orientation. As noted above, the spring in the over-center mechanism may be slightly compressed when the drive rod 34 is in its non-braking orientation or braking orientation so that the pins 20g define the braking and non-braking positions of the foot pedals. Further, the spring may be more compressed when the drive 34 is in either its braking or non-braking orientation.

Alternately, as described below, drive rod 34 may be biased between its braking and non-braking orientations by a cam over-center mechanism or a living hinge over-center mechanism, more fully described below in reference to FIGS. 6-10.

As noted above, linkage system 20 also includes one or more over-travel assemblies 42b and 42a (FIG. 2). Over-travel assemblies 42b are configured to allow the drive mechanism to drive the drive links to positions beyond what is necessary to move the respective caster brake actuators to their standard total brake positions. By driving the drive links beyond what is necessary to move the caster brake actuators 15 beyond their standard total brake positions, any extra force or play can be absorbed by the over-travel assemblies and, thus, compensate for tolerances that exist in the linkage system so that the internal brakes may be controlled simultaneously to move between their braking and non-braking positions.

As best seen in FIG. 3B, over-travel assembly 42b includes a link 54 that is eccentrically pinned by a sliding pin connection 56 at one end to drive rod 34 by way of a pair of drive links 58, which are fixedly mounted to drive rod 34, for example, welding or fasteners. Sliding pin connection 56 is formed by a pin 56a that is received in a slotted opening (not shown) in link 54 but which is pinned at its opposed ends to the ends of drive links 58. Link 54 is then rotatably coupled to caster brake pedal 15 at its opposed end so that as drive rod 34 rotates about its longitudinal axis, link 54 will push or pull on caster brake pedal 15 to move caster brake pedal 15 between its total braking position and its non-braking position. For example, the lower end of link 54 may be configured as a C-shaped clamp for engaging the edge of caster brake pedal 15. But as noted, drive links 58 may be driven by the drive mechanism to move beyond where it is necessary to move the caster brake actuators 15 to their total braking positions.

Additionally, mounted about link 54 is a spring 60. Spring 60 is captured between two stops 62a (FIG. 3B) and 62b (FIG. 3C), which are mounted on link 54. Stops 62a and 62b are mounted about link 54 at its lower and upper ends adjacent where link 54 couples to caster brake pedal 15 and beneath pin 56a, respectively. In this manner, as pin 56a moves along the slotted opening in link 54 in response to brake rod 34 rotating, spring 60 will be moved between a first (less) compressed configuration, which corresponds to the non-braking position, to a second (more) compressed configuration, which corresponds to the braking position, so that the force transmitted by link 54 to caster brake pedal 15 is limited by spring 60 which allows the drive links to be driven beyond where it is necessary to move caster brake pedal 15 to their full braking position but without applying any extra force to the caster brake pedal 15, which instead is absorbed by spring 60.

In this manner, as drive rod 34 rotates about its longitudinal axis, drive links 58 will pull or push on links 54, which in turn will pull or push on caster brake pedals 15 of rearward caster wheel assemblies 14b. As noted, when drive rod 34 is rotated to its braking orientation, each link 54 is configured to rotate to a position that corresponds to beyond where it would be otherwise needed to move the caster brake pedal 15 to its total brake position. Further as noted, sliding pivot connection 56 and spring 60 absorb any extra force and/or play in the linkage system to avoid damaging the caster wheel assemblies 14. Alternately or in addition, drive links 58 may be driven to drive where it is needed to move the caster brake actuators to their non-braking position. For example, the over-travel mechanism 42b can include two springs—one for absorbing any extra force and/or play in the braking direction and the other for absorbing any extra force and/or play in the non-braking direction.

Figure 4:
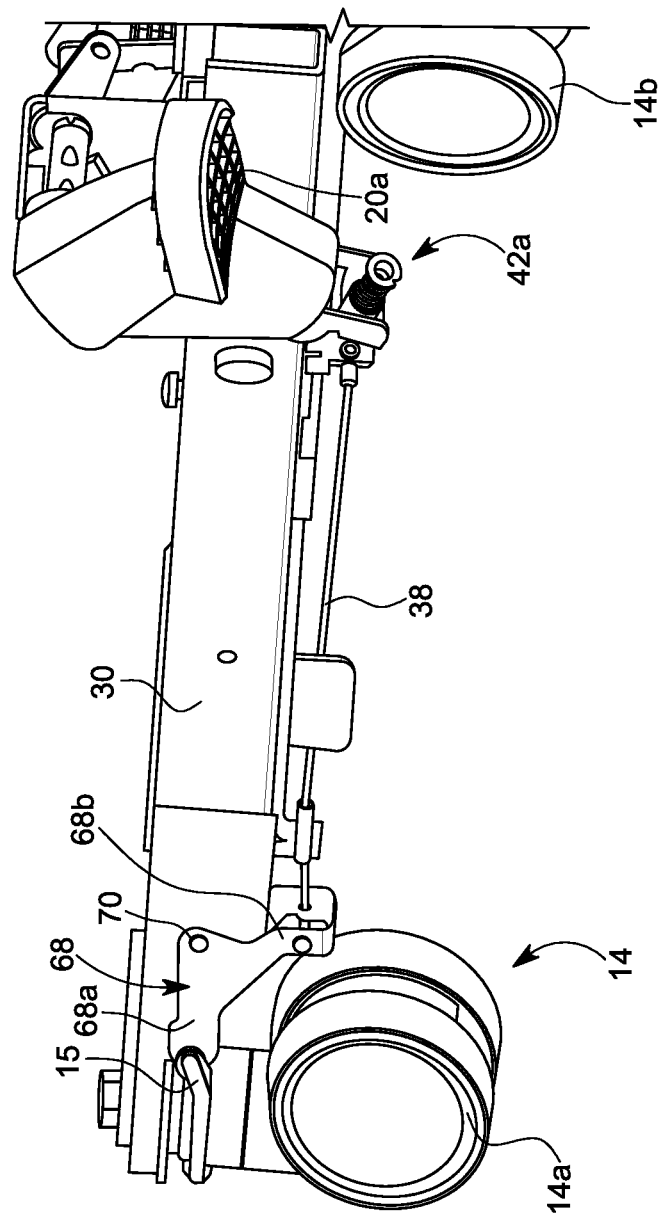
FIG. 4 is another enlarged fragmentary view of the base.

Referring to FIG. 4, pull cables 38 are coupled on one end to caster brake pedals 15 of forward caster wheel assemblies 14a by drive links 68. Each drive link 68 comprises a U-shaped link with a generally L-shaped configuration with two extending arms 68a for engaging caster brake pedal 15 of forward caster wheel assemblies 14a. Similar to link 54, arms 68a of link 68 each form or have a C-shaped clamp for engaging the lip or edge of caster brake pedal 15. Each drive link 68 is pivotally coupled to a respective longitudinal frame member 28, 30 by a pivot connection 70 (FIG. 4), which is located at the apex of drive link 68 so that when drive link 68 is pivoted about pivot connection 70, arms 68a form rocker arms for pulling on caster brake pedal 15 of forward caster wheel assembly 14a. Each link 68 is coupled to the end of a respective cable 38 by a pin that extends between the bases 68b of arms 68a so that when cable 38 is pulled by drive rod 34, link 68 will pivot about its pivot connection 70 to move caster brake pedal 15 to its braking position. Alternately, cable 38 may be replaced with a link to provide a push/pull function or may comprise a push/pull Bowden cable.

As best understood from FIG. 3, the opposed end of each pull cable 38 is coupled to drive rod 34 by way of a linkage assembly 72. Each linkage assembly 72 includes a U-shaped link 74 with a pair of arms 74a, which is pivotally mounted to a respective longitudinal frame member 28, 30 by a pin connection 76. Pin connection 76 pivotally mounts the medial portions of arms 74a to the respective longitudinal frame members 28, 30. The free ends 74b of arms 74a support a transverse rod 78, which couples to a second link 80. As best understood from FIG. 3B, second link 80 is rotatably coupled to drive rod 34 between a pair of drive links 82 by a transverse pin 84. Links 82 are fixed to drive rod 34 so that they rotate with drive rod 34. In this manner, as drive rod 34 rotates about its longitudinal axis, links 74, 80 will pull on cables 38 to thereby move the respective caster brake pedals 15 to their braking positions.

Figure 4A:
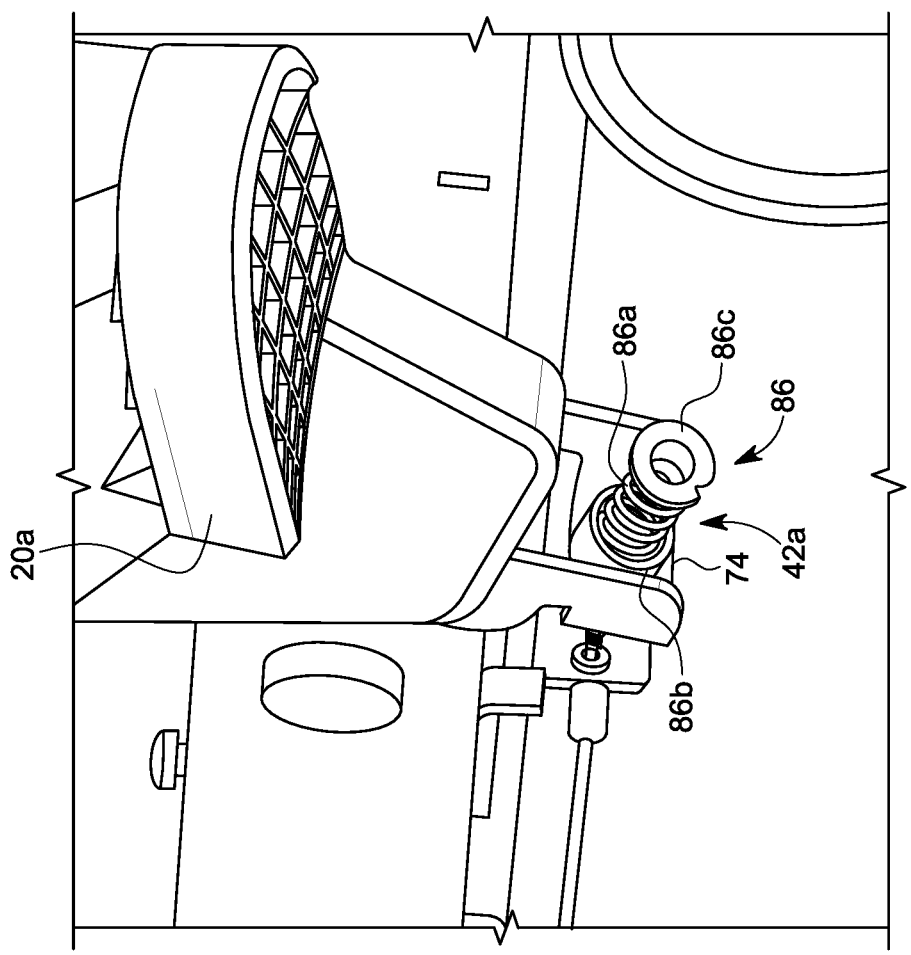
FIG. 4A is an enlarged perspective view of an over-travel mechanism for the forward caster wheel assemblies.

Referring to FIG. 4, as described above, forward caster wheel assemblies 14a also may include an over-travel mechanism 42a. Over-travel mechanism 42a similarly allows drive link 82 and linkage assembly 72 (FIG. 4A) to drive beyond the position associated with the total brake position of the respective caster brake pedal 15 of the forward caster wheel assemblies 14a. As best seen in FIG. 4A, over-travel mechanism 42a includes a spring assembly 86, which couples cable 38 to linkage assembly 72. Spring assembly 86 is mounted to the end of cable 38 and located between the end of cable 38 and transverse member 74 of link 72. Spring assembly 86 includes a spring 86a captured between a pair of stops 86b, 86c, with stop 86b adjacent transverse member 74, and cable 38 coupled to stop 86c. In this manner, when drive link 72 pulls on spring assembly 86, cable 38 will pull on caster brake pedal 15 to its braking position, with any extra force and/or play taken up by spring 86a. Accordingly, similar to over-travel mechanism 42b, the spring allows drive link 82 and linkage assembly 72 to be driven to a position beyond the position that corresponds to the total brake position of the caster brake pedal 15 of the forward caster brake assembly 14a, with any extra force and/or play absorbed by over-travel mechanism 42a. Optionally, the over-travel mechanism 42a may include two springs—with one spring configured to absorb any extra force and/or play in the braking direction (such as illustrated) and a second spring for absorbing any extra force and/or play in the non-braking direction. Alternately or in addition, the spring in over-travel assemblies 42a may be reconfigured to allow drive link 82 and linkage assembly 72 to be driven to a position beyond the position that corresponds to the non-braking position of the caster brake pedal 15 by, for example when cable 38 comprises a push/pull cable or when it is replaced by a link, orienting the spring so it compresses when the caster brake actuator 15 is moved to its non-braking position.

Referring again to FIG. 3C, person support apparatus 10 may include a controller, such as a microprocessor, which is in communication with a graphical user interface, such as a display that is mounted to support apparatus 10 to display the braking status of the caster wheel assemblies 14. To detect the braking status of the caster wheel assemblies 14, apparatus 10 may include one or more brake status switches 90 that are actuated when the internal brakes are in their braking positions or in their non-braking positions. For example, switch(es) 90 may be in communication with a controller that receives the signals from the switch and generates an output signal to the display based on the signal from the switch. For example, the display may display an icon or a light at the display based on signal from the switch. For examples of suitable displays, reference is made to U.S. Pat. App. Ser. No. 62/171,472 entitled PATIENT SUPPORT APPARATUSES WITH DYNAMIC CONTROL PANELS, filed Jun. 25, 2015 (P-477), and U.S. patent application Ser. No. 14/212,417, entitled MEDICAL SUPPORT APPARATUS, filed Mar. 14, 2014, which are incorporated by reference herein in their entireties.

In the illustrated embodiment, two switches are employed. For example, one switch may have a normally open state, and the other a normally closed state so that the controller is always receiving a signal from one of the switches, which can be used as a safety measure to confirm the brake-on status or the brake-off status is correct. Alternately, the switches may be activated by different orientations of the drive rod 34—for example, one sensor may be triggered when the drive rod is at a near but non-braking orientation, and another sensor may be triggered when the drive rod is in the braking orientation so that when the braking status is confirmed, there is further assurance that the internal brakes are in their total braking positions.

As best seen in FIG. 3C, switch 90 is mounted to base 12, for example, on transverse member 26. Switch 90 is actuated by a link 92 mounted to drive rod 34. For example, link 92 may comprise a U-shaped link, with two arms 94 that are mounted to rod 34 and a transverse member 96 that is located above switch 90 and actuates switch(es) 90 when rod 34 rotates to either its braking orientation or non-braking orientation so that the display may indicate the status of the caster wheel assemblies 14. In the illustrated embodiment, switch or switches 90 are plunger based switches. Optionally, the height of the plungers may be adjusted to provide sensing at different heights, as noted above, which may correspond to a braking orientation and a near, but non-braking orientation.

Figure 5:
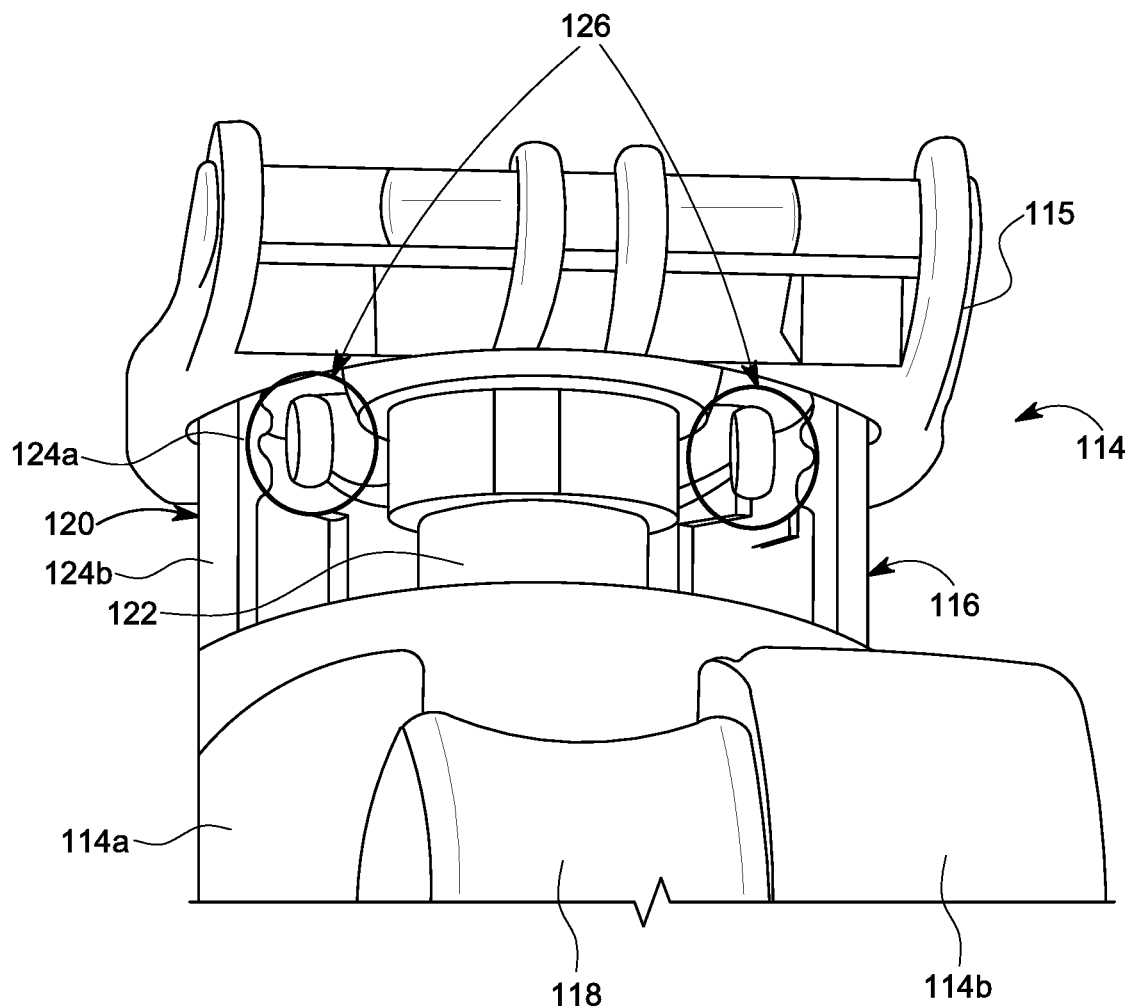
FIG. 5 is a perspective view of another embodiment of a caster wheel assembly.

Referring to FIG. 5, the numeral 114 generally designates a suitable embodiment of a caster wheel assembly with an internal brake and a caster brake pedal 115 that is suitable for use with linkage system 20 described above. Caster wheel assembly 114 includes a main wheel support body 116 that supports a pair of rotatable wheels 114b (wheel 114a is removed). Body 116 includes a central portion 118 and an upstanding portion 120. Central portion 118 supports the wheels for rotation about a horizontal axis and includes a pintle 122, which extends through upstanding portion 120 and mounts the wheels and body 116 to the person support apparatus for swivel movement about a vertical axis.

Upstanding portion 120 has an inner sleeve 124a and an outer housing 124b, with the pintle rotatably received in the cavity of the inner sleeve 124a. Caster brake pedal 115 is pivotally mounted to upstanding portion 120 by a pair of arms 126, which extend into and are pivotally received in inner sleeve 124a. If no external force is applied, caster brake pedal 115 may be biased into its non-braking by an internal spring, which is not shown, but located in body 116, and, as noted above, can pull on cable 38 when returning the caster brake pedal 115 of the forward caster wheel assemblies to their non-braking position. Alternately, an external spring may be used to bias the caster brake pedal 115 into its non-braking. Further yet, caster brake pedal 115 may not be biased at all, in which case the pull cable 38 may be replaced by a link or by a push/pull cable, so that the caster brake pedal 115 of the forward caster wheel assemblies 14a may be moved between their braking and non-braking positions by the linkage system 20. For further details of the construction of the body, the wheels, the internal brake, the sliding sleeve (not shown), the various springs, the castle lock formed by the teeth and keyways, and the pintle, reference is made to U.S. Pat. No. 8,205,297.

Figure 9:
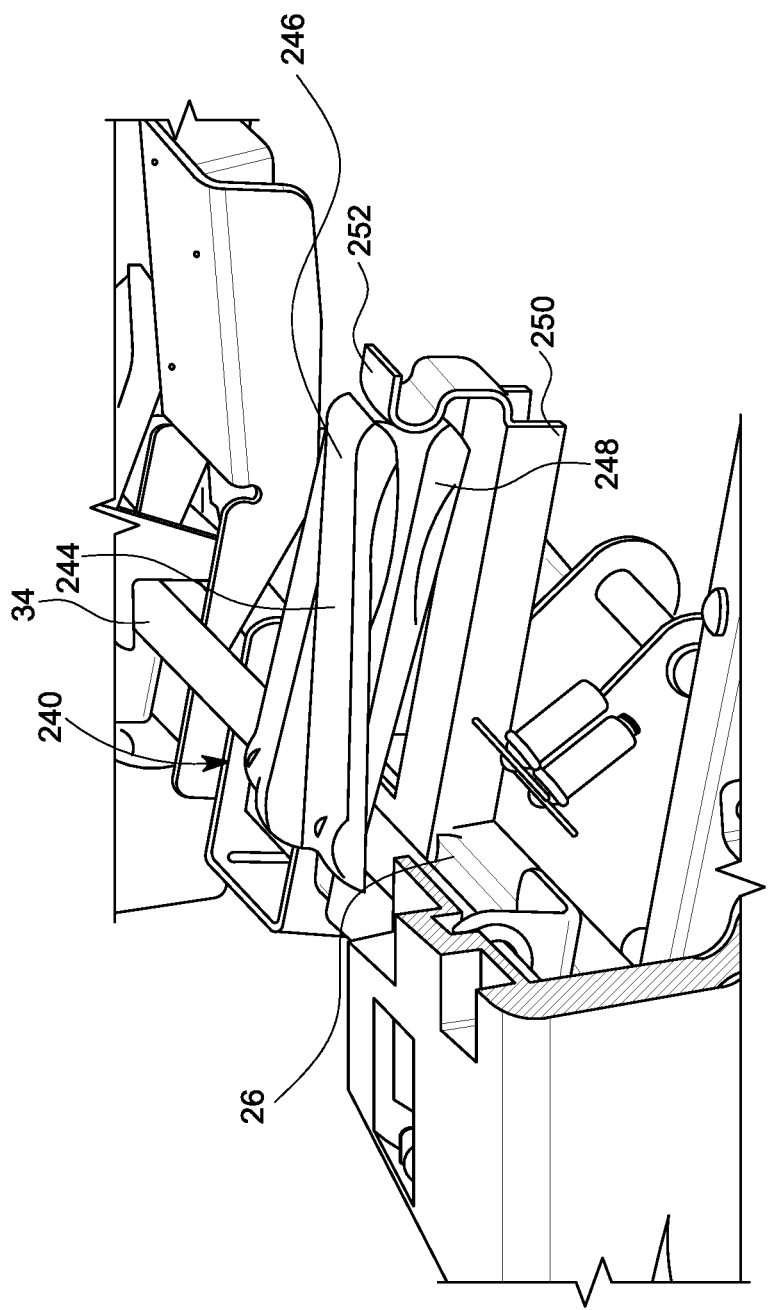
FIG. 9 is a perspective view of another embodiment of an over-center mechanism.

In contrast to the caster wheel assembly described in the referenced patent, however, arms 126 (which correspond to arms 56 in the referenced patent) that mount caster brake actuator 115 to body 116 do not include nipples (see projections or nipples 57 described in the referenced patent and shown in FIG. 9) for engagement with the described seating recesses (identified in the patent by 59). As described in the reference patent, the nipples index the arms 56 between three defined positions in the recesses (recesses 59) and thus form a detent mechanism for the caster brake actuators. Hence, wheel caster assembly 114 has a detent-less caster brake actuator that is free to move between its total braking position and its non-braking position.

Optionally, caster brake actuator 115 is biased toward its non-braking position by a spring (labeled as 108 in the referenced patent). As a result, caster wheel assembly 114 requires a constant holding external force, which is greater than the brake neutral force created by the spring (e.g. spring 108 in referenced patent), to maintain the caster wheel assembly internal brake in its total brake position (swivel and rotation lock). The no-detent design of the caster wheel assembly enables the use of the linkage system described above as a central timing system, which allows all four caster wheel assembly internal brakes to independently be engaged in their total braking positions or their non-braking positions. If one does not work, the other internal brakes will still operate independently. Further should one of the brakes gets jammed or stuck in its non-braking position—any extra force in the linkage system that results when trying to brake the stuck brake will be absorbed by the respective over-travel mechanism, which will avoid damage to whole system.

Figure 6:
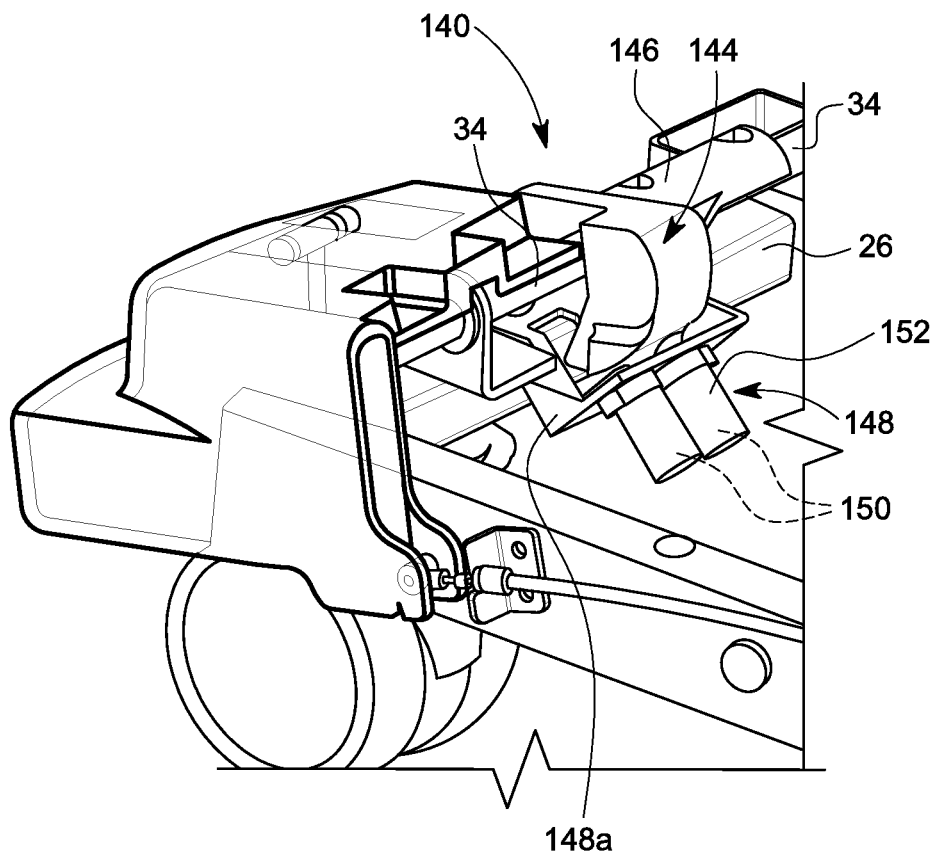
FIG. 6 is an enlarged perspective view of another embodiment of an over-center mechanism.

Referring to FIG. 6, the numeral 140 generally designates another embodiment of an over-center mechanism that is suitable for use in linkage system 20. In the illustrated embodiment, over-center mechanism 140 includes a cam 144, which is eccentrically mounted to drive rod 34 by way of mounting bracket 146, which is mounted to rod 34, for example, by fasteners. Cam 144 is biased between two positions, which correspond to the braking position and non-braking position of drive rod 34, by a detent assembly 148. Detent assembly 148 is supported on base 12, for example, on transverse member 26 and is positioned to engage cam 144.

Figure 7:
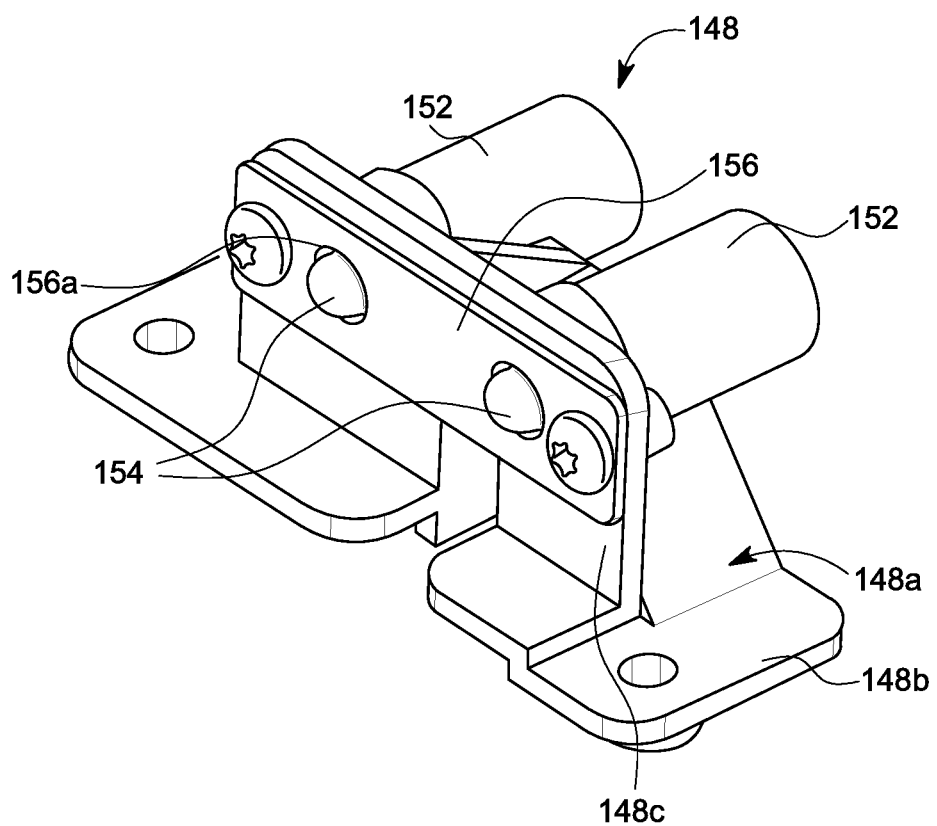
FIG. 7 is an enlarged perspective view of the detent mechanism of the over-center mechanism of FIG. 6.
Figure 8:
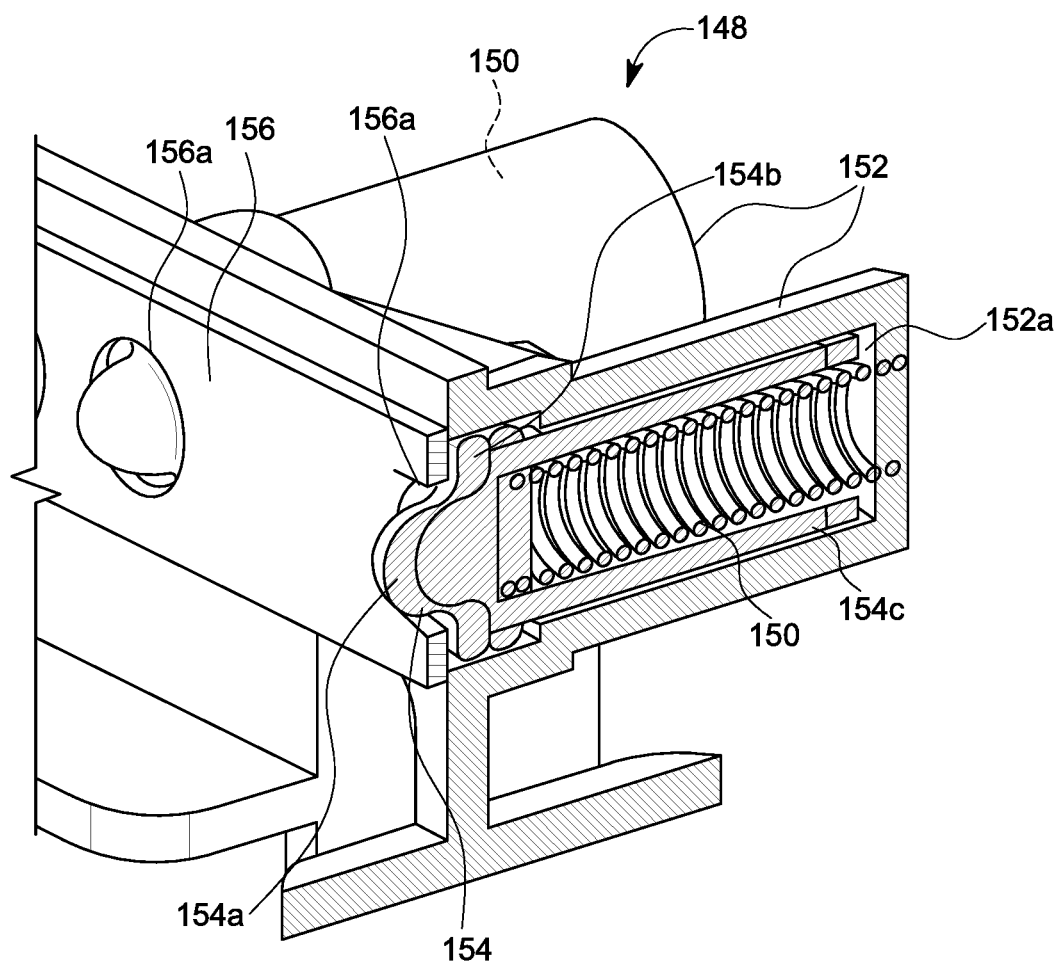
FIG. 8 is an enlarged cross-sectional view of the detent mechanism of FIG. 7.

Referring to FIGS. 7 and 8, detent assembly 148 includes a pair of springs 150 that are captured in a bracket 148a to urge detents 154 outwardly for engaging cam 144. In the illustrated embodiment, bracket 148a includes a mounting plate 148b for mounting bracket 148a to base 12 and a base plate 148c, which supports a pair of cylindrical members 152. Cylindrical members 152 form cavities 152a in which springs 150 are captured to urge detents 154 outwardly from the open ends of cylindrical members 152, which are aligned with corresponding openings 156a provided in the retaining plate 156 described below.

Detents 154 are retained on the ends of springs 150 and at least partially retained in cylindrical members 152 by retaining plate 156, which is secured over the open ends of cylindrical members 152 and secured to base plate 148c by fasteners. As noted, retaining plate 156 includes openings 156a that align with the open ends of cylindrical members 152 and are sized such that a portion of the detents 154 may extend through the retaining plate to engage cam 144 but still are retained in cylindrical members 152. For example, a suitable detent 154 may comprise a semi-spherical body 154a with a retaining flange 154b, which bears against retaining plate 156 around the opening 156a to retain the detent in cylindrical member 152. Additionally, each detent 154 may include a hollow body 154c to which semi-spherical body 154a is mounted and which extends into the respective cavity 152a of a cylindrical member 152 over spring 150.

Although not shown, cam 144 includes a pair corresponding recesses on its outwardly facing surface for engagement by the respective detents 154. For example, the recesses may be radially offset such that one recess corresponds to the braking position of drive rod 34 and the other recess corresponds to the non-braking position of rod 34. In this manner, when one of the recesses is aligned with one of the detents, the detent maintains the cam 144 and hence rod 34 in position until a sufficient force is applied to foot pedal 20a to overcome the spring force of the detent mechanism.

To limit rotation of the cam 144 between the respective braking and non-braking positions, cam 144 or detent mechanism 148 may include stops that define the outer boundaries of the range of motion of cam 144 (and hence rod) so that cam 144 can only toggle between the braking and non-braking positions.

Referring to FIG. 9, the numeral 240 designates another embodiment of an over-center mechanism. Over-center mechanism 240 comprises a living hinge 244, which is eccentrically mounted to drive rod 34, for example, by fasteners. Living hinge 244 comprises a generally V-shaped body with an upper arm 246 and a lower arm 248. The neutral state of living hinge 244 is such that the two arms are separated by a first angle. As will be described below, when drive rod 34 rotates, one of the arms will contact a cam structure, which will cause the arm to deflect and change the angle between the arms to a second angle. Optionally, the living hinge may be made from a stiffer material, with cam structure 252 providing the flexibility to allow the hinge to toggle between its two positions. Alternately, such as described below and shown in reference to FIG. 10, where the cam structure is stiffer, the living hinge may be formed from an elastomeric material or other flexible material.

Over-center mechanism 240 also includes a bracket 250, which mounts to base 12, for example to transverse member 26. Bracket 250 extends adjacent living hinge 244, for example, beneath living hinge 244 and includes cam structure 252, for example, a semi-circular plate, for engagement by the distal ends of arms 246 and 248. The upper and lower ends of cam structure 252 are selected so that they define the boundaries between the braking position and the non-braking position of arms 246 and 248 to thereby define the boundaries of the braking position and non-braking position of drive rod 34.

As would be understood from FIG. 9, as drive rod 34 is rotated about its longitudinal axis, living hinge 244 will rotate with rod 34 so that the distal ends of arms 246 and 248 will contact cam structure 252, which interaction biases rod 34 into either its braking position or non-braking position. Thus, in this embodiment, the biasing force is provided by arms 246, 248.

Figure 10:
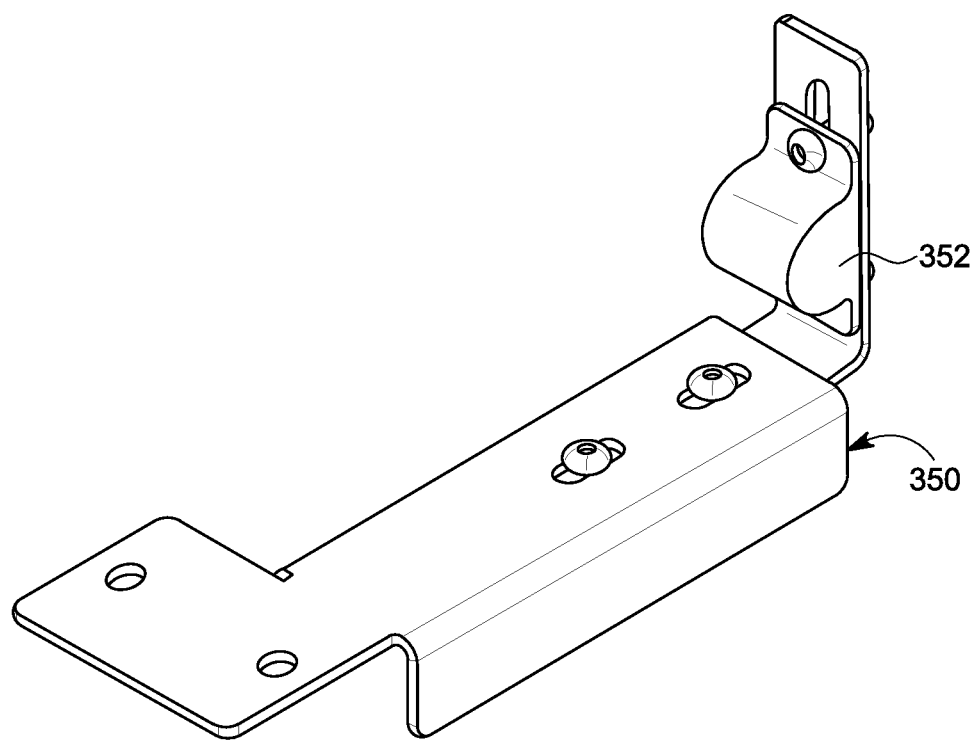
FIG. 10 is a perspective view of another embodiment of a bracket of the over-center mechanism of FIG. 9.

Referring to FIG. 10, the numeral 350 designates another embodiment of the bracket suitable for use with over-center mechanism 240. Bracket 350 is of similar construction to bracket 250 but has an adjustable length to vary the biasing force on rod 34. Furthermore, bracket 350 includes an adjustable cam structure 352, which can be vertically adjusted to adjust the braking and non-braking positions of rod 34. Optionally, as described above, the cam structure may provide the flexibility. For example, cam structure 352 may comprise an elastomeric or rubber body. Alternately, cam structure 352 may be rigid, with the flexibility provided by the living hinge.

Accordingly, in any of the above drive mechanisms, the drive mechanism may be configured to drive the drive rod, and, hence, links beyond what is necessary to move the caster brake actuators to their total braking and/or non-braking position. The braking system described herein can accommodate variations in tolerances of its component parts, due to creep, due to stretch, or manufacturing tolerances.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

We claim:

1. A person support apparatus comprising:
   a base, the base including a plurality of caster wheel assemblies, each of the caster wheel assemblies including a caster brake actuator movable between a total braking position and a non-braking position;
   a drive rod coupled to the caster brake actuators to control the caster brake actuators and operable to move the caster brake actuators between the total braking positions and the non-braking positions; and
   an over-center spring coupled to the drive rod applying a biasing force to urge the drive rod between a braking orientation and a non-braking orientation to move the caster brake actuators between the total brake positions and the non-braking positions.

2. The person support apparatus according to claim 1, wherein the over-center spring is configured to continue apply the biasing force on the drive rod when the drive rod is in the braking orientation.

3. The person support apparatus according to claim 1, wherein the caster wheel assemblies comprise a pair of forward caster wheel assemblies, and the caster brake actuators of the forward caster wheel assemblies being coupled to the drive rod by cables.

4. The person support apparatus according to claim 3, wherein each of the caster wheel assemblies comprises a pair of rearward caster wheel assemblies, and each respective rearward caster wheel assembly of the rearward caster wheel assemblies being coupled to the drive rod by a linkage.

5. The person support apparatus according to claim 1, wherein the over-center spring is configured to continue to apply a biasing force on the drive rod when the drive rod is in the non-braking orientation.

6. The person support apparatus according to claim 1, further comprising a controller and a display, said controller in communication with the display to display the braking status of the caster wheel assemblies.

7. The person support apparatus according to claim 1, further comprising:
   at least two switches, one of the two switches generating a signal when the drive rod is in the braking orientation to indicate a total braking status of the caster brake actuators, and another of the two switches generating a signal when the drive rod is in the non-braking orientation to indicate a non-braking status of the caster brake actuators; and
   a controller in communication with the at least two switches wherein the controller uses both sensors to confirm the total braking status of the caster brake actuators.

8. The person support apparatus according to claim 7, wherein one of the switches has a normally open state, and the other of the two switches has a normally closed state.

9. The person support apparatus according to claim 8, further comprising a bracket mounted to the drive rod, the switches comprising plunger switches and being depressed by the bracket when the drive rod changes orientation.

10. The person support apparatus according to claim 7, further comprising a spring, the spring applying a biasing force to the drive rod toward the braking orientation or toward the non-braking orientation.

11. The person support apparatus according to claim 7, wherein the person support apparatus comprises a medical recliner chair.

12. The person support apparatus according to claim 7, wherein said controller is always receiving a signal from one of the two switches and uses the signal from one of the two switches and absence of the signal from another of the two switches as a safety measure to confirm the non-braking status or the total braking status is correct.

13. The patient support according to claim 1, further comprising:
   a linkage system,
   the linkage system being external to said caster wheel assemblies, and each of the caster wheel assemblies comprising:
   a wheel;
   a caster brake; and
   the caster brake actuators each movable between a first position wherein the caster brake actuators move the caster brakes to a total braking positions wherein the wheels are prevented from swiveling and rotating and a second position wherein the caster brake actuators move the caster brakes to non-braking positions, and the caster brake actuators being configured to move freely between the first positions and the second positions wherein the caster wheel assemblies require the linkage system to lock the caster brakes in the total braking positions or the non-braking positions.

14. The patient support according to claim 13, further comprising wheel supports for supporting the wheels, the wheel supports being configured for swivel movement about generally vertical axes, and the wheels being mounted to the wheel supports for rotational movement about generally horizontal axes.

15. The patient support according to claim 14, wherein the caster brake actuators are supported by the wheel supports.

16. The patient support according to claim 14, the caster wheel assemblies each further comprising a pair of arms, wherein each the wheel support comprises a wheel support body, and each caster brake actuator is mounted to a respective wheel support body of the wheel support bodies by a respective pair of arms of the pair of arms.

17. The patient support according to claim 13, the caster wheel assemblies each further comprising a spring, the springs biasing the brake actuators towards the non-braking positions.

18. A person support apparatus comprising:
   a base, the base including a plurality of caster wheel assemblies, each of the caster wheel assemblies including a caster brake actuator movable between a total braking position and a non-braking position;
   a drive rod coupled to the caster brake actuators to control the caster brake actuators and operable to move the caster brake actuators between the total braking positions and the non-braking positions; and
   wherein each of the caster brake actuators is independently coupled to the drive rod.

19. A person support apparatus comprising:
   a base, the base including a plurality of caster wheel assemblies, each of the caster wheel assemblies including a caster brake actuator movable between a total braking position and a non-braking position;
   a drive rod coupled to the caster brake actuators to control the caster brake actuators and operable to move between a braking orientation where the caster brake actuators are moved to the total braking positions and a non-braking orientation where the caster brake actuators are moved to the non-braking positions;
   at least two switches, one of the two switches generating a signal when the drive rod is in the braking orientation to indicate a total braking status of the caster brake actuators, and another of the two switches generating a signal when the drive rod is in the non-braking orientation to indicate a non-braking status of the caster brake actuators wherein one of the switches has a normally open state, and the other of the two switches has a normally closed state;
   a bracket mounted to the drive rod, the switches comprising plunger switches and being depressed by the bracket when the drive rod changes orientation and wherein the switches comprise adjustable height plunger switches to adjust the orientation of the drive rod sensed by the switches; and a controller in communication with the at least two switches wherein the controller uses both sensors to confirm the total braking status of the caster brake actuators.

* * * * *

UNITED STATES PATENT AND TRADEMARK OFFICE
CERTIFICATE OF CORRECTION

| | |
|---|---|
| PATENT NO. | : 11,167,591 B2 |
| APPLICATION NO. | : 16/371212 |
| DATED | : November 9, 2021 |
| INVENTOR(S) | : Jacob Paul Kloss et al. |

It is certified that error appears in the above-identified patent and that said Letters Patent is hereby corrected as shown below:

In the Claims

Column 16, Line 3, Claim 13:
"caster brakes to a total braking positions wherein the"
Should be:
-- caster brakes to total braking positions wherein the --

Signed and Sealed this
Fourth Day of April, 2023

Katherine Kelly Vidal
*Director of the United States Patent and Trademark Office*